United States Patent [19]
Wagner et al.

[11] 3,876,807
[45] Apr. 8, 1975

[54] PROCESS FOR INCREASING DIGESTIBILITY OF LEGUME SEEDS

[75] Inventors: Joseph R. Wagner, Moraga; Alfred C. Olson, El Cerrito; Robert Becker, Lafayette; Samuel Kon, Berkeley, all of Calif.

[73] Assignee: The United States of America as represented by the Secretary of Agriculture, Washington, D.C.

[22] Filed: Sept. 24, 1973

[21] Appl. No.: 399,889

[52] U.S. Cl. .................. 426/46; 426/205; 426/352; 426/431; 426/373
[51] Int. Cl................................................ A23l 1/21
[58] Field of Search ............ 426/46, 148, 205, 431, 426/352, 372, 373, 375

[56] References Cited
UNITED STATES PATENTS

| | | | |
|---|---|---|---|
| 1,813,268 | 7/1931 | Bachler | 426/431 X |
| 2,052,215 | 8/1936 | Cohn | 426/373 X |
| 2,881,076 | 4/1959 | Sair | 426/205 |
| 3,407,073 | 10/1968 | Guidarelli | 426/372 X |

*Primary Examiner*—A. Louis Monacell
*Assistant Examiner*—Esther L. Massung
*Attorney, Agent, or Firm*—M. Howard Silverstein; Max D. Hensley; William Takacs

[57] ABSTRACT

Legume seeds are held in an aqueous medium for 24–48 hours at a temperature of 45°–55°C., the pH of the medium preferably being 5.0–5.5. The treated seeds exhibit increased digestibility, and less flatulence is experienced when they are consumed.

7 Claims, No Drawings

PROCESS FOR INCREASING DIGESTIBILITY OF LEGUME SEEDS

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of processes for treating legumes whereby to increase their digestibility and at the same time to reduce flatulence experienced when these legumes are consumed. Further objects and advantages of the invention will be evident from the following description wherein parts and percentages are by weight unless otherwise specified.

It is well-known that legumes are valuable foods and are widely used for such purpose. The seeds of legumes are especially valuable for their high content of proteins. Legume seeds also contain certain carbohydrates, including phytate (inositol hexaphosphate) and $\alpha$-oligosaccharides such as stachyose and raffinose. These carbohydrates are potentially valuable nutrients but are generally not utilized by the body. Indeed, they create digestive problems. The point is that neither phytate nor many of the $\alpha$-oligosaccharides are hydrolyzed by human gastrointestinal secretions. Thus, these materials are nutritionally unavailable and continue down the intestine into the colon wherein a variety of microorganisms hydrolyze these materials. This hydrolysis is accompanied by the production of gases, i.e., flatus, commonly associated with the ingestion of legumes.

We have found that legumes may be processed in such a way as to hydrolyze phytate and many $\alpha$-oligosaccharides. The process of the invention increases the digestibility of legumes and at the same time reduces the amount of flatus associated with their consumption. A particular advantage of the invention is that except for adjustment of pH the process is accomplished without additives. In the process of the invention, the natural enzymes in the legumes are activated. Once activated, these enzymes promote the hydrolysis that ultimately results in a more digestible bean product.

The process of the invention is applicable to legume seeds of all kinds. Typically, one may use seeds of the genus Phaseolus, including the common beans such as large white, small white, pinto, red kidney, lima, etc.; the genus Pisum, including smooth and wrinkled peas and yellow or green varieties; the genus Vigna, including the blackeye beans (or blackeye peas as they are sometimes termed); the genus Lens, including lentils; the genus Cicer, including garbanzo or chick peas; the genus Soja, that is, soybeans. Ordinarily, the legume seeds to which the process is applied are the usual dry seeds available in commerce. For example, in the case of beans, these products are often referred to as dry shell beans because the product includes only the mature seeds, the pods having been removed.

As mentioned above, no additives other than those used for control of pH are used in the process of the invention. Rather, the invention uses the natural legume enzymes to hydrolyze the $\alpha$-oligosaccharides and phytic acid into more digestible components. Another advantage of the invention is that it may be applied to both whole and ground beans. Thus, the process of the invention is well-suited to the formation of products in which the integrity of the legume seeds must be maintained.

DETAILED DESCRIPTION OF THE INVENTION

The practice of the invention is next described in detail.

Raw legume seeds, either whole, crushed, or ground, are mixed with water. The amount of water used in the mixture is not critical. Usually, we use about 2.5 to 10 parts of water per part of legume seeds. The mixture at this point will have a natural pH of about 6.0 to 6.5. In order to activate the enzymes in the seeds, the pH of the mixture is reduced to below 6.0. For optimum results, a pH of 5.0–5.5 is used. It should be noted, however, that some benefits of the invention are realized at a pH below 5.0. The pH adjustment is made by adding the appropriate amount of a food-grade acid such as hydrochloric, sulphuric, phosphoric, acetic, or the like. Instead of an acid one can use a non-toxic buffer such as acetate buffer which is a mixture of acetic acid and sodium acetate.

The mixture is then incubated (held) for about 24–48 hours at a temperature at which the natural enzymes are active, i.e., from about 25° to about 75°C. For optimum results, the temperature is held at 45°–55°C. During this incubation period the seed enzymes hydrolyze many of the $\alpha$-oligosaccharides and the phytic acid. In this way digestible components are produced; for example, the hydrolysis of the $\alpha$-oligosaccharides—stachyose and raffinose—produces sucrose, glucose, and galactose and the hydrolysis of phytic acid yields inositol and inorganic phosphates.

Following the incubation period, it may be desirable or necessary to restore the pH to a value of about 6.0–6.5. Whether or not this pH restoration is needed ultimately depends on the extent of acidification in the incubation step, and on the intended use of the product. If the pH for the incubation is low and not compatible with the food preparation in which the product will be employed, it will be necessary to add a sufficient amount of a food-grade alkali to reinstate the natural pH of the seeds. Useful for this purpose are the alkali metal hydroxides or carbonates, particularly sodium hydroxide, carbonate, or bicarbonate.

After the incubation—or after the pH restoration, if such is used—the treated seeds are cooked. They may be separated from the aqueous medium and cooked in boiling water or by contact with steam. In a preferred embodiment of the invention the beans are cooked in the same medium in which the incubation was carried out. This is desirable to save any water-soluble components—such as glucose, sucrose or the like—which have been leached out of the seeds during the incubation. As in conventional cooking practice, the mixture is held at the boiling point of water for the period of time required to cook the seeds. The length of cooking will depend on the nature of the seeds and their form, i.e., whether they are whole, crushed, or ground. The proper time in any case can easily be judged by chewing and tasting the product.

After the beans are cooked, they may be consumed directly or processed for distribution to the consumer. The type of processing depends on the form of the seeds, i.e., on whether the seeds were initially ground or whole. If the seeds were ground, the resulting cooked paste can be combined with other foods or dehydrated by standard procedures to yield a dry bean powder which may be employed in food preparations. Whole seeds prepared in accordance with the invention may be canned or frozen or they may be combined with other foods and the combination canned or frozen.

The invention is further demonstrated by the following illustrative examples.

EXAMPLE 1

Effect of Time of Incubation on the Hydrolysis of α-Oligosaccharides and Phytic Acid in California Small White Beans Ten grams of California small white beans, ground in a Wiley Mill using a 20-mesh screen, were placed in a 250-ml. Erlenmeyer flask. One hundred ml. of 0.1 M acetate buffer (pH 5.2) was added and the mixture shaken gently for 1 hour at 25°C. After removal of an aliquot representing a control for analytical purposes, the flask was capped and placed in a shaker water bath at 45°C. The flask was shaken at 120–130 cycles per minute (with a 1.5 inch stroke).

After 9, 24, and 48 hours, aliquots were removed for analysis. The concentrations of raffinose, stachyose, and inositol in all samples were determined by gas-liquid chromatography of their trimethylsilyl derivatives.

The aforesaid experiment was repeated, using 10 g. of whole, dry California small white beans.

The results of the analysis are tabulated below.

Data from the determination of the amount of inositol formed were used to calculate the amount of phytic acid that had been hydrolyzed. Since partial hydrolysis of phytic acid (i.e., cleavange of only part of the attached phosphate groups) may have occurred, in addition to total hydrolysis, the reported values for hydrolyzed phytic acid may be lower than the actual values.

| Run | Form of beams | Time of incubation (hrs.) | Stachyose (%) | Raffinose (%) | Phytic acid hydrolyzed (m mole %) |
|---|---|---|---|---|---|
| 1 | Ground | 9 | 2.4 | 0.3 | 0.89 |
| 2 | do. | 24 | 1.6 | 0.2 | 1.05 |
| 3 | do. | 48 | 1.2 | 0.1 | 1.11 |
| 4 | Whole | 24 | 1.7 | 0.2 | 0.89 |
| Control | Ground | 0 | 3.4 | 0.4 | 0.17 |

EXAMPLE 2

Effect of Temperature of Incubation on the Hydrolysis of α-Oligosaccharides and Phytic Acid in California Small White Beans The procedure described in Example 1 was followed except that only ground beans were studied, the time of incubation was 48 hours, and the temperature of incubation was varied as follows: 25°, 35°, 45°, 55°, 65°, and 75° C.

Analyses for stachyose, raffinose, and inositol were made according to the procedure in Example 1. The results are summarized below.

| Run | Temp. of incubation (°C.) | Stachyose (%) | Raffinose (%) | Phytic acid hydrolyzed (m mole %) |
|---|---|---|---|---|
| 1 | 25 | 2.3 | 0.22 | 0.94 |
| 2 | 35 | 1.7 | 0.13 | 1.50 |
| 3 | 45 | 0.8 | 0.07 | 1.33 |
| 4 | 55 | 0.8 | 0.05 | 0.94 |
| 5 | 65 | 1.0 | 0.08 | 0.50 |
| 6 | 75 | 3.7 | 0.33 | 0.33 |
| Control | — | 3.7 | 0.38 | 0.33 |

EXAMPLE 3

Effect of pH on the Hydrolysis of α-Oligosaccharides and Phytic Acid in California Small White Beans The procedure described in Example 1 was followed except that only ground beans were used, the time of incubation was 24 hours, and the pH of the 10-ml. aliquots was buffered at 3.4, 4.4, 5.2, 6.4, and 7.1, respectively, prior to incubation.

Analyses for stachyose, raffinose, and inositol were made according to the procedure in Example 1. The results are tabulated below.

| Run | pH | Stachyose, % | Raffinose, % | Phytic acid hydrolyzed (m mole %) |
|---|---|---|---|---|
| 1 | 3.4 | 2.66 | 0.28 | 0.51 |
| 2 | 4.4 | 1.44 | 0.19 | 0.69 |
| 3 | 5.2 | 1.34 | 0.19 | 0.86 |
| 4 | 096.4* | 2.14 | 0.26 | 0.81 |
| 5 | 7.1 | 1.50 | 0.19 | 0.07 |

*Natural pH of beans in water; no buffer was added.

EXAMPLE 4

Hydrolysis of α-Oligosaccharides in Other Legume Seeds

The procedure outlined in Example 1 was followed. The beans were ground and placed in a 0.10 M acetate buffer at pH 5.2. Incubation was conducted for 48 hours at 45° C. Analyses for stachyose and raffinose were performed as described in Example 1 on the treated products and on untreated controls.

The beans studied were White Ventura (A), Red Kidney (B), Sanilac (C), and Pinto (D). The results are summarized below.

| Run | Variety of bean | Stachyose (%) | | Raffinose (%) | |
|---|---|---|---|---|---|
| | | 0 hrs. (control) | 48 hrs. | 0 hrs. (control) | 48 hrs. |
| A | White Ventura | 2.88 | 1.35 | 0.462 | 0.198 |
| B | Red kidney | 2.35 | 0.68 | 0.258 | 0.094 |
| C | Sanilac | 2.33 | 0.38 | 0.406 | 0.055 |
| D | Pinto | 3.12 | 0.0 | 0.372 | 0.055 |

EXAMPLE 5

Correlation Between Hydrolysis of α-Oligosaccharides (Stachyose and Raffinose) in California Small White Beans and Reduction of Hydrogen Production in Rats California small white beans were ground to pass 20-mesh screen and 300 g. was placed in 2 liters of water to which 1.5 ml. of glacial acetic acid was added (pH 5.2). The mixture was incubated in a rotary incubator shaker at 45° C. for 48 hours. The incubated bean slurry was then cooked for 1 hour on the steam bath. The cooked product was dehydrated by lyophilization.

Additional preparations were made as above described with the following variations: In one run the incubation time was 9 hours; in another the incubation time was 24 hours; in another the beans were whole rather than ground and the incubation time was 24 hours. Also, a control bean powder was prepared by grinding untreated beans, cooking an aqueous slurry thereof for 1 hour on the steam bath, and dehydrating it by lyophilization.

The preparations were then used in rat feeding studies conducted as described by Gumbman et al. in Proc. Soc. Exp. Biol. and Med., Vol. 137, No. 9, pp 1171–1175. In these tests the rats are held in a closed system and the hydrogen evolved by each rat is determined. Since the amount of hydrogen is correlated with total flatus gas, this determination provides a measure of the flatus-producing character of the products.

The results of the experiments are tabulated below.

| Run | State of beans | Time of incubation (hrs.) | α-Oligosaccharides (Stachyose & raffinose) (%) | Ratio of hydrogen production from beans of the invention to that from control |
|---|---|---|---|---|
| 1 | Ground | 48 | 1.2 | 0.28 |
| 2 | " | 24 | 1.6 | 0.49 |
| 3 | " | 9 | 2.4 | 0.60 |
| Control | " | 0 | 4.0 | 1.00 |
| 4 | Whole | 24 | 1.9 | 0.50 |
| Control | " | 0 | 4.0 | 1.00 |

Having thus described our invention, we claim:

1. A process for increasing the digestibility of beans of the genus Phaseolus, which comprises
   a. mixing the said beans with water, adjusting the pH of the mixture to 5.0–5.5, incubating the mixture for 24–48 hours at a temperature of 45°–55° C., and
   b. cooking the so-treated beans.

2. A process for increasing the digestibility of beans of the genus Phaseolus, which consists of
   a. forming a mixture which consists solely of raw beans of the genus Phaseolus, water, and a food-grade acid or buffer in an amount to provide a pH of 5.0 to 5.5,
   b. incubating the said mixture for 24–48 hours at a temperature of 45°–55° C., and
   c. cooking the so-treated beans by heating the said mixture at about 100° C. for a period long enough to make the beans tender and edible.

3. The process of claim 2 wherein there is the additional step of restoring the natural pH of the beans after completion of Step (b).

4. The process of claim 2 which includes the additional step of dehydrating the cooked mixture.

5. The process of claim 2 wherein the beans are whole.

6. The process of claim 2 wherein the beans are ground prior to application of Step (a).

7. The process of claim 2 wherein the beans are California Small White beans.

* * * * *